(12) United States Patent
Kulkarni

(10) Patent No.: US 10,218,498 B2
(45) Date of Patent: Feb. 26, 2019

(54) EFFICIENT HASH TABLE KEY STORAGE

(71) Applicant: Avago Technologies International Sales Pte. Limited, Singapore (SG)

(72) Inventor: Abhay Kulkarni, Milpitas, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 304 days.

(21) Appl. No.: 14/819,769

(22) Filed: Aug. 6, 2015

(65) Prior Publication Data

US 2017/0041134 A1   Feb. 9, 2017

(51) Int. Cl.
*H04L 9/32* (2006.01)
*H04L 9/06* (2006.01)
*H04L 9/08* (2006.01)

(52) U.S. Cl.
CPC .......... *H04L 9/0643* (2013.01); *H04L 9/0861* (2013.01)

(58) Field of Classification Search
CPC ........................... H04L 9/0643; H04L 9/0861
USPC ........................ 713/171, 193, 181
See application file for complete search history.

(56) References Cited

U.S. PATENT DOCUMENTS

| | | | |
|---|---|---|---|
| 7,885,268 B2* | 2/2011 | Pong | H04L 45/00 370/392 |
| 9,241,044 B2* | 1/2016 | Shribman | H04L 67/06 |
| 2008/0112412 A1* | 5/2008 | Pong | H04L 29/12801 370/392 |
| 2014/0093073 A1* | 4/2014 | Horgan | H04L 9/0643 380/44 |
| 2015/0067819 A1* | 3/2015 | Shribman | H04L 67/06 726/12 |

* cited by examiner

*Primary Examiner* — Samson B Lemma
(74) *Attorney, Agent, or Firm* — Sterne, Kessler, Goldstein & Fox P.L.L.C.

(57) ABSTRACT

The present disclosure is directed to a system and method for compressing keys of key-data item pairs for storage in a hash table to reduce power and/or area requirements of the memory used to implement the hash table. The system and method of the present disclosure use the hash function to compress a key of a key-data item pair. More specifically, the system and method of the present disclosure effectively remove information from the key that can be predicted using in the hash value of the key to generate a compressed key. Information in the key that is not predictable using the hash value of the key can be included in the compressed key to allow for recovery of the key.

20 Claims, 5 Drawing Sheets

EFFICIENT HASH TABLE KEY STORAGE

TECHNICAL FIELD

This application relates generally to hash tables, including key storage in hash tables.

BACKGROUND

A data structure is a way of organizing a collection of data items. Different data structures are more or less efficient in performing operations on a specific collection of data items. Common operations include inserting, deleting, and searching for a data item in the data structure. A data structure's efficiency in performing these so-called "dictionary operations" and other operations is often measured in terms of time and memory space required to complete the operation, with more efficient data structures requiring less time and/or less memory space.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
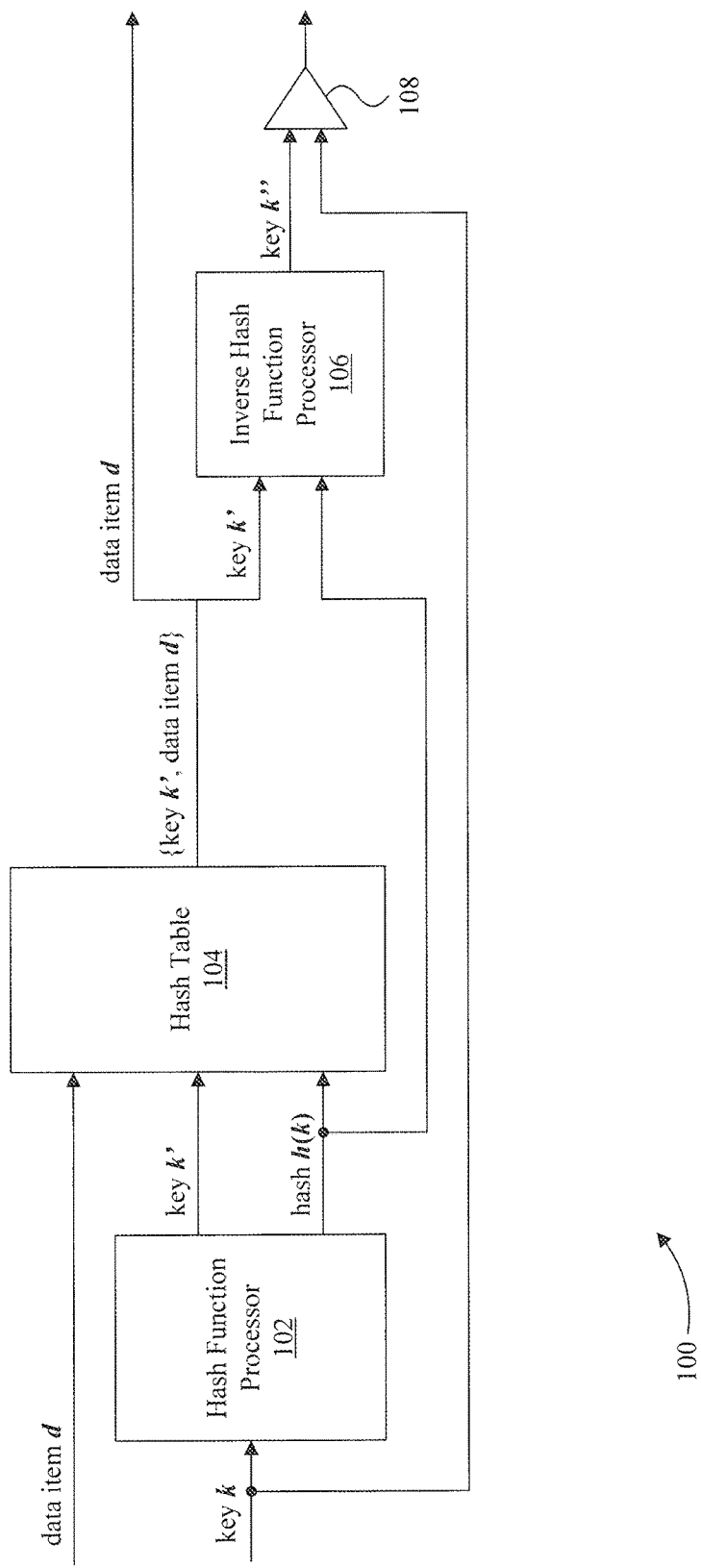
FIG. 1 illustrates a block diagram of a hash-based storage architecture with efficient key storage in accordance with embodiments of the present disclosure.

In the following description, numerous specific details are set forth in order to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of this discussion, a block shown in one of the accompanying drawings illustrating a block diagram shall be understood to include software, firmware, or hardware (such as one or more circuits, special purpose processors, and/or general purpose processors), or any combination thereof. In addition, each block shown in one of the accompanying drawings can include one or more components within an actual device, and each component that forms a part of the described block can function either cooperatively or independently of any other component forming a part of the block. Conversely, multiple blocks described herein can represent a single component within an actual device. Further, components within a block can be in a single device or distributed among multiple devices and can communicate in a wired or wireless manner.

1. Overview

Many applications require a data structure that allows for fast performance of the dictionary operations (i.e., inserting, deleting, and searching) on a collection of data items that are each associated with a unique key drawn from a universe $U=\{0, \ldots, m-1\}$ of keys. A direct address table is one such data structure that can be used for this purpose. A direct address table uses an array $T[0:m-1]$ to organize the collection of data items, where each slot in the array $T[0:m-1]$ corresponds to a different key in the universe U of keys. For example, the slot $T[k]$ stores, or points to, the data item in the collection of data items with key k. If the collection of data items has no data item associated with key k, then the slot $T[k]$ stores, or points to, no data item (or null).

The dictionary operations are trivial to implement for a direct address table in terms of time. For example, to search for a data item with key k, the array $7T[0:m-1]$ can be directly addressed with key k to return the data item stored, or pointed to, at that slot. Thus, this operation is fast: with a O(1) worst-case search time. Insertion and deletion of data items can be similarly accomplished by directly addressing the array $T[0:m-1]$ and have the same O(1) worst-case performance time.

Although fast, the direct address table generally only works well when the universe U of keys is small. Otherwise, the direct address table can require a prohibitively large amount of memory. In addition, much of the memory reserved by array $T[0:m-1]$ of the direct address table is often wasted because the number of data items in the collection of data items stored can be small relative to the size of the universe U of keys.

When the collection of data items stored is small relative to the size of the universe U of keys, a hash table requires much less memory than a direct address table, while still having a time-complexity O(1) for each of the dictionary operations. The only difference is that this bound is for the average time, as will be explained further below, and not the worst-case time like the direct address table.

A hash table uses an array $T[0:n-1]$ to organize the collection of data items. An element with a key k is stored in slot $h(k)$ of the array $T[0:n-1]$, where h is a hash function that maps the universe U of keys to the slots of the hash table array $T[0:n-1]$; i.e., $h: U \rightarrow \{0, 1, \ldots, n-1\}$. A data item with key k can therefore be quickly searched for within a hash table by using the hash function h to map the key k to the slot h(k) and then accessing the slot h(k) in the hash table array T[0:n−1] to determine whether the hash table stores, or points to, a data item with key k. Key k is said to hash to slot h(k).

In general, the hash function h reduces the range of indices that need to be handled from m (number of keys in the universe U of keys) to only n (number of slots in the hash table array T[0:n−1]), where n<m. The issue with this approach is that two keys in the collection can hash to the same slot of the hash table array T[0:n−1] given that the hash function h maps the larger domain space of the universe U of keys to the smaller domain space of the hash table array T[0:n−1]. This situation, where two keys in the collection hash to the same slot, is referred to as a collision. Because each slot of a hash table can store, or point to, multiple data items in a collection, rather than a single data item, each slot of a hash table is often referred to as bucket.

The challenge with handling the case where multiple keys map to the same bucket of a hash table is still being able to quickly perform one or more of the dictionary operations. For example, assuming no collisions, a data item with key k can be quickly searched for within a hash table, as explained above, by using the hash function h to map key k to a bucket h(k) and then accessing the bucket h(k) in the hash table array T[0:n−1] to determine whether the hash table stores, or points to, a data item with key k. With collisions, the bucket h(k) that key k maps to may now contain multiple data items. Thus, further search through the multiple data items in the bucket h(k) will need to be performed in order to locate a data item with key k. This is why the bound O(1) for searching a hash table is for the average time and not the worst-case time like direct addressing.

To keep search times down, data items stored in a bucket of a hash table can be read out from memory in parallel, given that each read from a memory has some associated latency. The problem with this approach is that a bucket can have, for example, 4-8 data items, and each data item is also stored together with its associated key as a key-data item pair. The keys are stored to allow a data item with a specific key k to be located in a bucket that contains multiple data items. Depending on the application to which the keys and data items are associated with, the keys can have lengths as high as 256-bits and the data items can have lengths greater than 100-bits. With 4-8 data items per bucket and key and data item sizes of 256-bits and 100-bits, respectively, memories with wide words and/or multi-port memories are used to read out the key-data item pairs of a bucket in parallel. However, memories with wide words and multi-port memories are generally sub-optimal in terms of power and/or area.

The present disclosure is directed to a system and method for compressing keys of key-data item pairs stored in a hash table to reduce power and/or area requirements of the memory used to implement the hash table. The system and method of the present disclosure use the hash function to compress a key of a key-data item pair. More specifically, the system and method of the present disclosure effectively remove information from the key that can be predicted using the hash value of the key to generate a compressed key. Information in the key that is not predictable using the information of the hash value of the key can be included in the compressed key to allow for recovery of the key. These and other features of the present disclosure are discussed further below.

2. Efficient Hash Table Key Storage

FIG. 1 illustrates a block diagram of a hash-based storage architecture 100 with efficient key storage in accordance with embodiments of the present disclosure. Hash-based storage architecture 100 is configured to store and organize a collection of data items, each identified by a unique key k drawn from a universe U={0, . . . , m−1} of keys, in such a manner that provides for fast searching over the collection of data items, while limiting power and/or area requirements. As shown in FIG. 1, hash-based storage architecture 100 includes a hash function processor 102, a hash-table 104, an inverse hash function processor 106, and a comparator 108.

Before describing the search functionality of hash-based storage architecture 100, insertion of a key-data item pair (k, d) into hash table 104 is described. To insert a key-data item pair (k, d) into hash table 104, hash function processor 102 first performs a hash function h to map the input key k to a hash value h(k). In general, the hash function h reduces the range of indices that need to be handled from m (number of keys in the universe U of keys) to only n (number of buckets in hash table 104), where n<m. The hash function h can be any one of several different hash functions. For example, the hash function h can be a cyclic redundancy check (CRC) hash function, a multiplicative hash function, or a modular hash function.

After mapping the input key k to the hash value h(k), a typical hash-based storage architecture would store the key-data item pair (k, d) in the bucket of hash table 104 identified by the hash value h(k). To reduce the amount of information stored in hash table 104, hash-based storage architecture 100 uses a modified hash function processor 102 to generate a compressed key k' and then stores the compressed key k' in place of the input key k in hash table 104 together with data item d.

To compress the input key k, hash function processor 102 specifically removes information from the input key k that can be predicted from the hash value h(k) and includes information from the input key k that is not predictable from the hash value h(k) in the compressed key k'. Because at least some of the information from the input key k that is predictable from the hash value h(k) is not included in the compressed key k', the compressed key k' has a smaller length in terms of bits than the input key k.

To provide an example of the generation of a compressed key k', an example CRC hash function h can be assumed to be implemented by hash function processor 102 to map an input key k to a hash value h(k). To perform the CRC hash function h, hash function processor 102 can first append a number of zeros to the input key k. After appending the zeros to the input key k, hash function processor 102 can then divide the zero-padded key k with a polynomial P. The remainder R of the division, or some portion $R_1$ of the remainder R, can then be used as the hash value h(k). The portion $R_1$ can correspond to some number of least-significant bits of the remainder R, for example.

A hash function h is generally an invertible function, meaning that there is an inverse hash function $h^{-1}$ that "reverses" the hash function h and maps the hash value h(k) back to the input key k. For the above described CRC hash function h, the inverse hash function $h^{-1}$ is given by:

$$h(h(k))^{-1}=(Q*P)+(R_1+R_2)=k$$

where P is the polynomial used by the CRC hash function h to divide the zero-padded input key k, Q is the quotient that results from the CRC hash function h dividing the input key k by the polynomial P, $R_1$ is the portion of the remainder R that results from the CRC hash function h dividing the input key k by the polynomial P (and is also the portion of the remainder R used as the hash value h(k)), and $R_2$ is the portion of the remainder R not used to form $R_1$. The addition of $(R_1+R_2)$ represents the reconstruction of the remainder R.

As can be seen from the inverse CRC hash function $h^{-1}$ given by the above equation, the input key k can be recovered using four pieces of information (or three pieces of information where $R_1$=R): Q, P, $R_1$, and $R_2$. P is constant and known, and $R_1$ is equal to the hash value h(k). Thus, to perform a search operation, only Q and $R_2$ (when $R_1 \neq R$) need to be stored in order to recover the input key k using the inverse CRC hash function $h^{-1}$ given by the above equation. These two pieces of information, which can be shown to have a combined length in terms of bits that is less than or equal to the size of the input key k, can be included in the compressed key k' to allow for recovery of the input key k to perform a search operation.

Inverse hash function processor 106 is configured to perform the inverse hash function $h^{-1}$ to recover the input key k from the compressed key k' stored in hash table 104. For example, during a search operation for a data item d associated with input key k, hash function processor 102 can first determine the hash value h(k) of the input key k and provide the hash value h(k) to hash table 104. Hash table 104 can then provide, in response, each compressed key and data item pair (k', d) stored in the bucket identified by the hash value h(k) as output. FIG. 1 illustrates only one such compressed key and data item pair (k', d) being output by hash table 104 for clarity purposes. It will be appreciated by one of ordinary skill in the art that multiple such compressed key and data item pairs can be output by hash table 104 in other instances.

Inverse hash function processor 106 is configured to receive the compressed key k' and hash value h(k) and process the compressed key k' and hash value h(k) to recover the input key k. For example, where hash function processor 102 implements the CRC hash function described above, inverse hash function processor 106 can evaluate the inverse CRC hash function $h^{-1}$ given by the above equation using the hash value h(k), the information included in the compressed key k', and the known polynomial P. Once recovered, the recovered key k'' at the output of inverse hash function processor 106 can be compared to the input key k to determine whether the data item d read from table 104 corresponds to the input key k.

Figure 2:
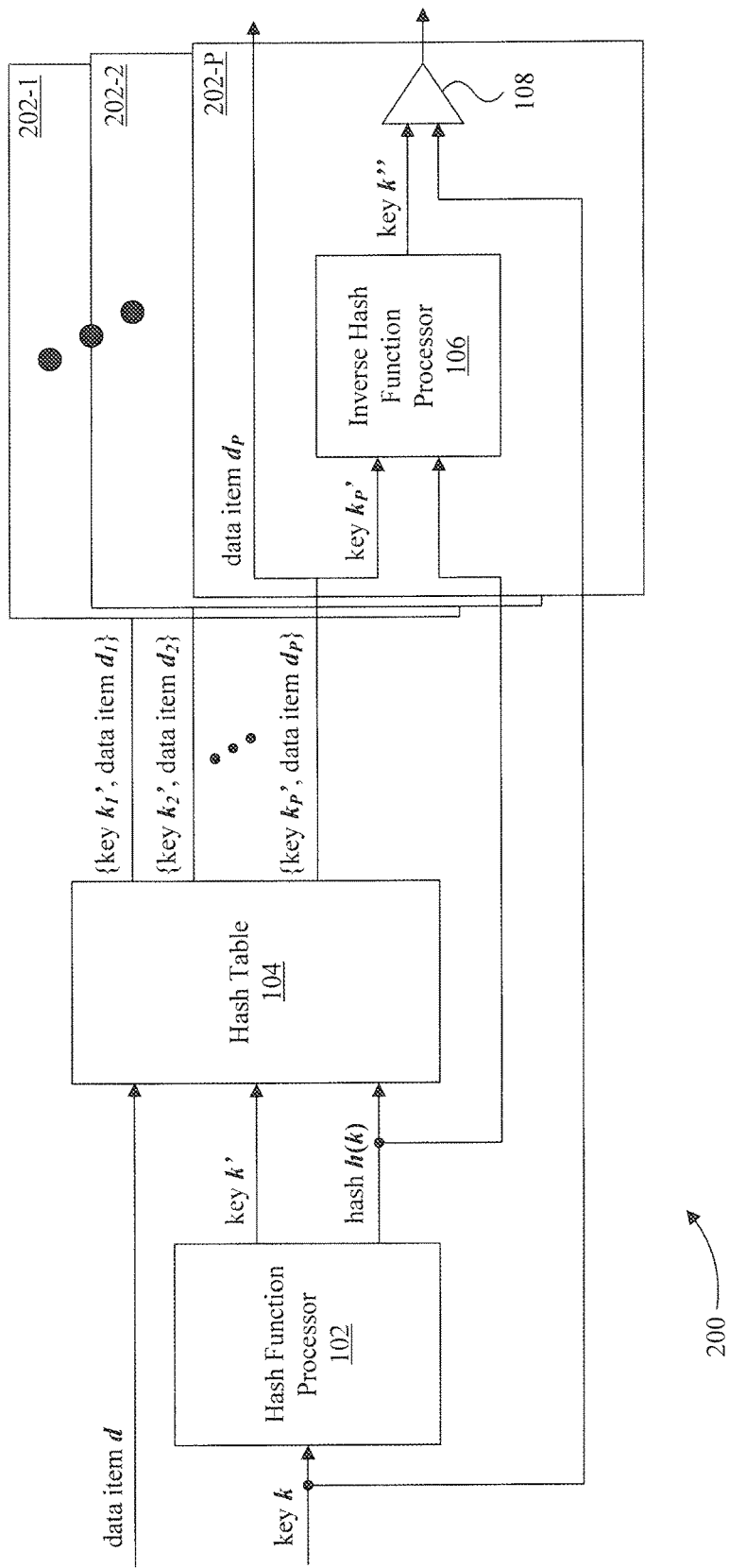
FIG. 2 illustrates another block diagram of a hash-based storage architecture with efficient key storage in accordance with embodiments of the present disclosure.

Referring now to FIG. 2, a block diagram of another hash-based storage architecture 200 with efficient key storage in accordance with embodiments of the present disclosure is illustrated. Hash-based storage architecture 200 has the same basic structure and functionality as hash-based storage architecture 100 in FIG. 1, with the exception that multiple instances 202-1 through 202-P of inverse hash function processor 106 and comparator 108 are provided.

As noted above, a bucket of hash table 104 can store, or point to, multiple data items because a hash function h reduces the range of indices that need to be handled from m (number of keys in the universe U of keys) to only n (number of slots in the hash table), where n<m. As a result, two keys can hash to the same slot of hash table 104. In general, each instance 202-1 through 202-P of inverse hash function processor 106 and comparator 108 can be used to process a different compressed key and data item pair ($k_p'$, $d_p$) read out from a bucket of hash table 104 in parallel.

For example, during a search operation for a data item d associated with input key k, hash function processor 102 can first determine the hash value h(k) of the input key k and provide the hash value h(k) to hash table 104. Hash table 104 can then provide, in response, each compressed key and data item pair ($k_p'$, $d_p$) stored in the bucket identified by the hash value h(k) as output. Each compressed key and data item pair ($k_p'$, $d_p$) read out of hash table 104 from the bucket can then be processed by a respective instance 202-1 through 202-P of inverse hash function processor 106 and comparator 108 to locate the data item d stored in hash table 104 that is associated with the input key k, assuming such a data item d is stored in hash table 104.

Figure 3:
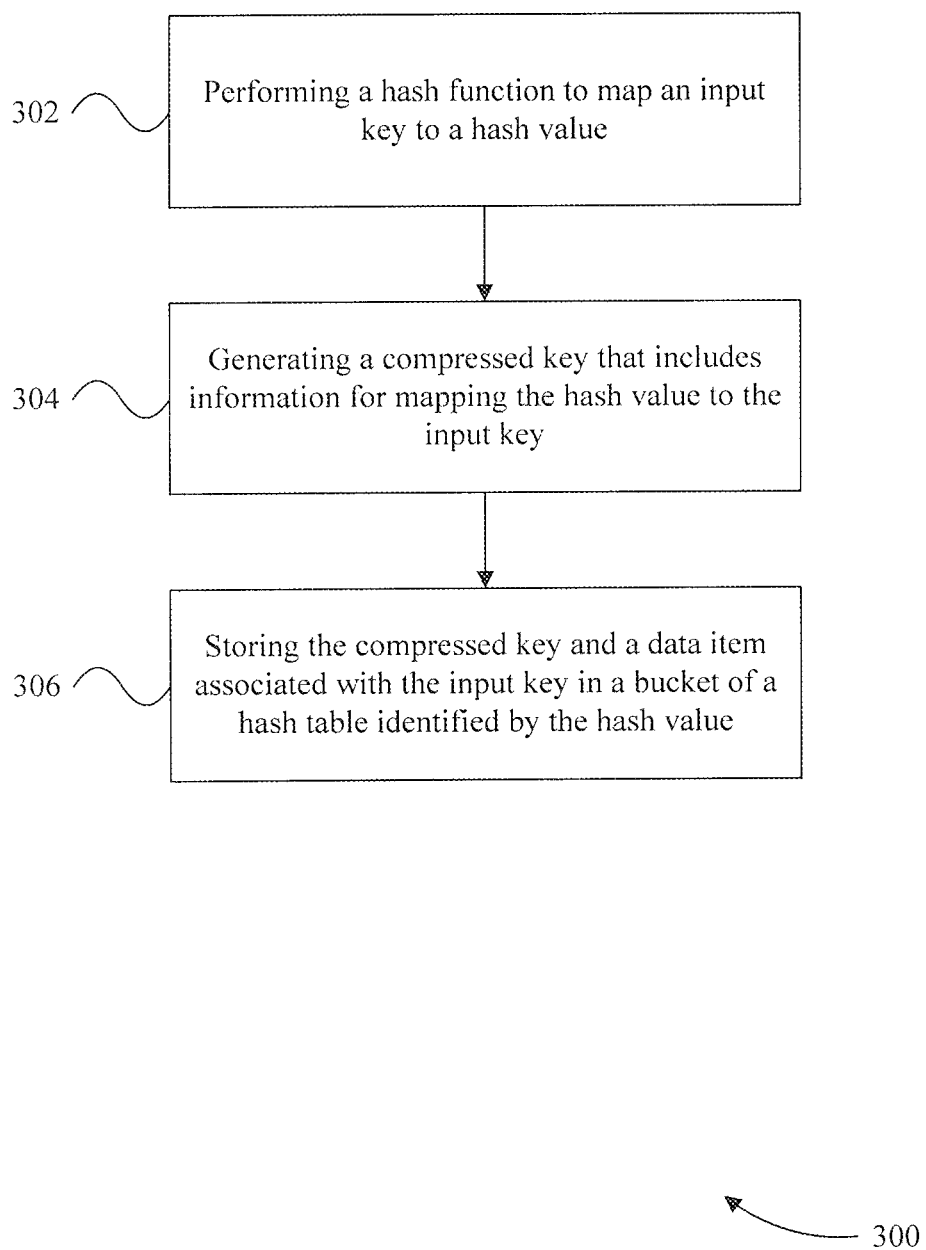
FIG. 3 illustrates a flowchart of a method for efficient key storage in a hash-based storage architecture in accordance with embodiments of the present disclosure.

Referring now to FIG. 3, a flowchart 300 of a method for efficient key storage in a hash-based storage architecture in accordance with embodiments of the present disclosure is illustrated. The method of flowchart 300 can be implemented by either one of hash-based storage architecture 100 in FIG. 1 or hash-based storage architecture 200 in FIG. 2. However, the method of flowchart 300 is not limited to those hash-based storage architectures and can be implemented by other, appropriate hash-based storage architectures as will be appreciated by one of ordinary skill in the art.

The method of flowchart 300 begins at step 302. At step 302, a hash function is performed to map an input key to a hash value. The hash function can be any one of several different hash functions. For example, the hash function can be a cyclic redundancy check (CRC) hash function, a multiplicative hash function, or a modular hash function.

After the hash value is generated at step 302, the method of flowchart 300 proceeds to step 304. At step 304, a compressed key that includes information for mapping the hash value back to the input key is generated. To compress the input key, information from the input key that can be predicted from the hash value is removed and information from the input key that is not predictable from the hash value is included in the compressed key. Because at least some of the information from the input key that is predictable from the hash value is not included in the compressed key, the compressed key generally has a smaller length than the input key. An example compressed key generation was described above in regard to FIG. 1.

After the compressed key is generated at step 304, the method of flowchart 300 proceeds to step 306. At step 306, the compressed key and data item associated with the input key are stored as a pair in a bucket of a hash table identified by the hash value.

Figure 4:
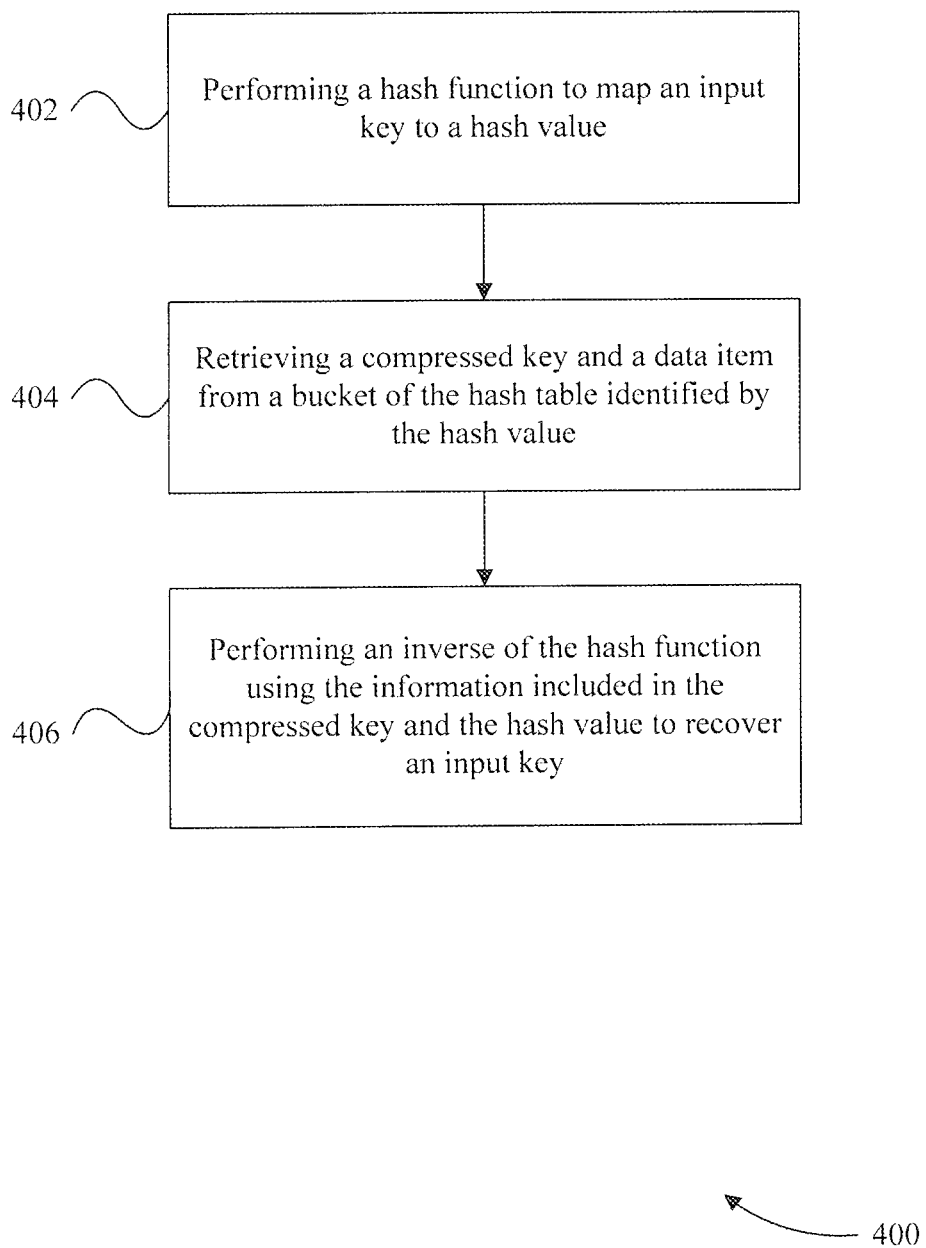
FIG. 4 illustrates a flowchart of a method for performing a search operation for a data item associated with an input key in accordance with embodiments of the present disclosure.

Referring now to FIG. 4, a flowchart 400 of a method for performing a search operation for a data item associated with an input key in accordance with embodiments of the present disclosure is illustrated. The method of flowchart 400 can be implemented by either one of hash-based storage architecture 100 in FIG. 1 or hash-based storage architecture 200 in FIG. 2. However, the method of flowchart 400 is not limited to those hash-based storage architectures and can be implemented by other, appropriate hash-based storage architectures as will be appreciated by one of ordinary skill in the art.

The method of flowchart 400 begins at step 402. At step 402, a hash function is performed to map an input key to a hash value. The hash function can be any one of several different hash functions. For example, the hash function can be a cyclic redundancy check (CRC) hash function, a multiplicative hash function, or a modular hash function.

After the hash value is generated at step 402, the method of flowchart 400 proceeds to step 404. At step 404, a compressed key and data item are retrieved from the bucket of the hash table identified by the hash value produced at step 402. The compressed key includes information for mapping the hash value back to its associated input key.

More specifically, the compressed key includes information from the input key that is not predictable from the hash value.

After the compressed key and data item are retrieved from the hash table at step 404, the method of flowchart 400 proceeds to step 406. At step 406, the inverse of the hash function is performed using the information included in the compressed key and the hash value produced at step 402 to recover the input key. An example inverse hash function was described above in regard to FIG. 1. The recovered input key can then be compared with the input key used at step 402 to produce the hash value to determine whether the data item associated with the input key used at step 402 has been located.

Hash-based storage architectures 100 and 200 and the methods of flowcharts 300 and 400 described above can be used in many different applications, including packet forwarding and packet routing network applications as will be appreciated by one of ordinary skill in the art.

For example, many computer networks utilize a switch to connect devices together so that frames can be forwarded between the devices. Unlike a hub, a switch does not simply flood an incoming frame received from one device out each of its ports to all other devices. Rather, a switch transmits an incoming frame only out the port connected to the device in which the frame was addressed, assuming such port is known. This helps to reduce unnecessary traffic on the network.

To accomplish this intelligent forwarding operation, a switch needs to continually learn about its environment. Devices can not only join and leave the network to which a switch is connected, but they can also move between ports on the switch. A switch can keep track of the devices coupled to its ports by examining each incoming frame for a media access control (MAC) address that identifies the source device of the frame and then associating the MAC address with the port over which the frame is received in a forwarding table. Using the forwarding table, the switch can then forward incoming frames that are intended for receipt by a particular device only out the port to which that particular device is attached. The forwarding table can be implemented using one of hash-based storage architectures 100 or 200 or the method of flowchart 300 described above.

Unlike a switch, a router routes IP packets between IP networks using an IP routing table. In general, a router looks up the destination IP address of a received IP packet in the routing table. Assuming the destination IP address is found, the router routes the packets to the destination. The router table can be implemented using one of hash-based storage architectures 100 or 200 or the methods of flowcharts 300 and 400 described above.

Another potential application for hash-based storage architectures 100 and 200 and the methods of flowcharts 300 and 400 includes supporting a caching layer between a webserver and a database. A webserver can retrieve popular website content from the caching layer, implemented as a key-value store, to reduce the access load on the database.

3. Example Computer System Environment

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 5:
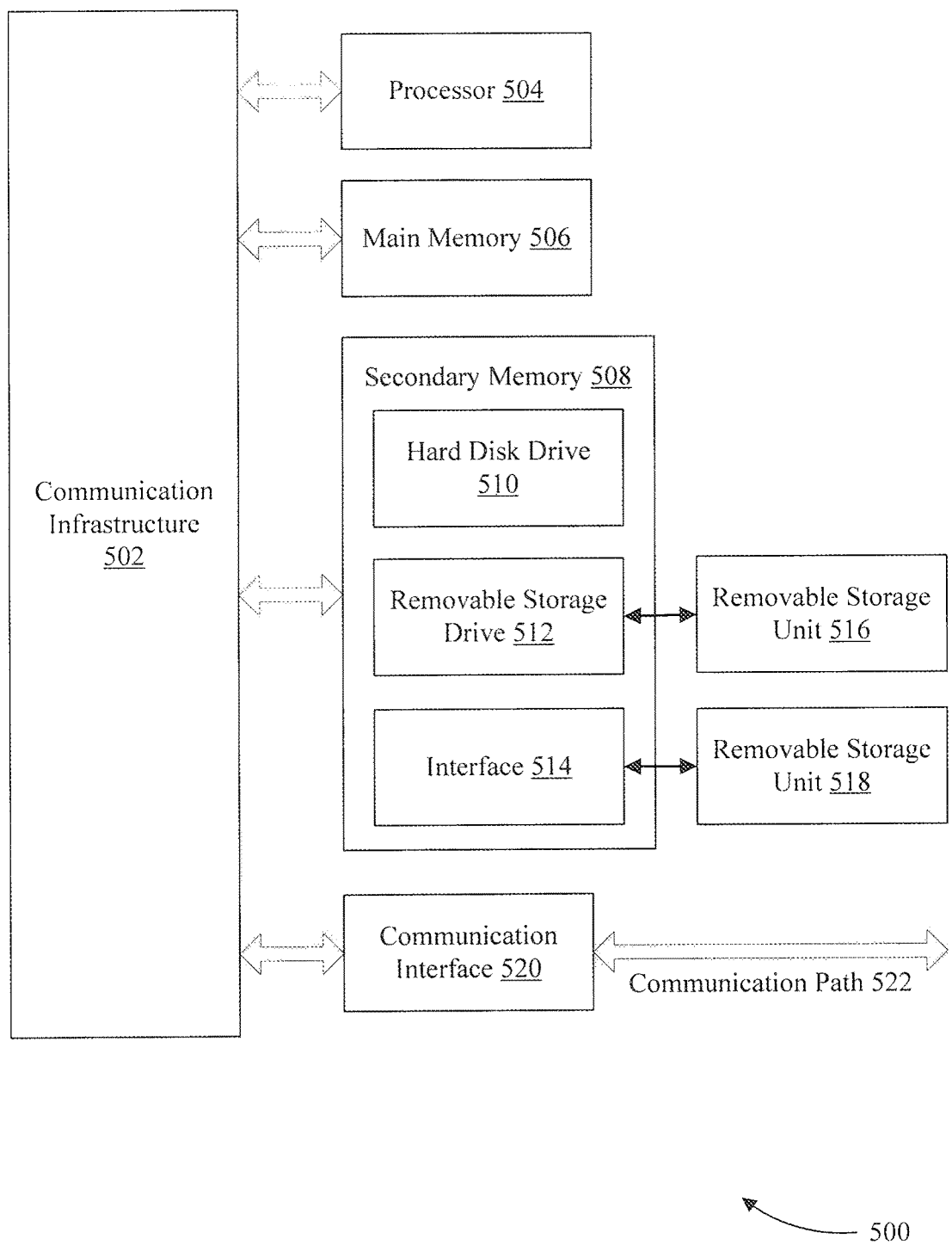
FIG. 5 illustrates a block diagram of an example computer system that can be used to implement aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 500 is shown in FIG. 5. Blocks depicted in FIG. 2 may execute on one or more computer systems 500. Furthermore, each of the steps of the methods depicted in FIG. 3 and FIG. 4 and can be implemented on one or more computer systems 500.

Computer system 500 includes one or more processors, such as processor 504. Processor 504 can be a special purpose or a general purpose digital signal processor. Processor 504 is connected to a communication infrastructure 502 (for example, a bus or network). Various software implementations are described in terms of this exemplary computer system. After reading this description, it will become apparent to a person skilled in the relevant art(s) how to implement the disclosure using other computer systems and/or computer architectures.

Computer system 500 also includes a main memory 506, preferably random access memory (RAM), and may also include a secondary memory 508. Secondary memory 508 may include, for example, a hard disk drive 510 and/or a removable storage drive 512, representing a floppy disk drive, a magnetic tape drive, an optical disk drive, or the like. Removable storage drive 512 reads from and/or writes to a removable storage unit 516 in a well-known manner. Removable storage unit 516 represents a floppy disk, magnetic tape, optical disk, or the like, which is read by and written to by removable storage drive 512. As will be appreciated by persons skilled in the relevant art(s), removable storage unit 516 includes a computer usable storage medium having stored therein computer software and/or data.

In alternative implementations, secondary memory 508 may include other similar means for allowing computer programs or other instructions to be loaded into computer system 500. Such means may include, for example, a removable storage unit 518 and an interface 514. Examples of such means may include a program cartridge and cartridge interface (such as that found in video game devices), a removable memory chip (such as an EPROM, or PROM) and associated socket, a thumb drive and USB port, and other removable storage units 518 and interfaces 514 which allow software and data to be transferred from removable storage unit 518 to computer system 500.

Computer system 500 may also include a communications interface 520. Communications interface 520 allows software and data to be transferred between computer system 500 and external devices. Examples of communications interface 520 may include a modem, a network interface (such as an Ethernet card), a communications port, a PCM-CIA slot and card, etc. Software and data transferred via communications interface 520 are in the form of signals which may be electronic, electromagnetic, optical, or other signals capable of being received by communications interface 520. These signals are provided to communications interface 520 via a communications path 522. Communications path 522 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 516 and 518 or a hard disk installed in hard disk drive 510.

These computer program products are means for providing software to computer system 500.

Computer programs (also called computer control logic) are stored in main memory 506 and/or secondary memory 508. Computer programs may also be received via communications interface 520. Such computer programs, when executed, enable the computer system 500 to implement the present disclosure as discussed herein. In particular, the computer programs, when executed, enable processor 504 to implement the processes of the present disclosure, such as any of the methods described herein. Accordingly, such computer programs represent controllers of the computer system 500. Where the disclosure is implemented using software, the software may be stored in a computer program product and loaded into computer system 500 using removable storage drive 512, interface 514, or communications interface 520.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

4. Conclusion

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A system, comprising:
a hash function processor implemented using a hardware device, the hash function processor configured to process a key-data item pair for storage by:
performing a hash function to map an input key to a hash value, wherein the hash function includes a division function that results in a quotient value and a remainder value having a first portion and a second portion, and the hash value is equal to the first portion of the remainder value that results from the division function, and
generating a compressed key that includes information for mapping the hash value to the input key, wherein the information includes the quotient value and the second portion of the remainder value, and does not include the first portion of the remainder value; and
a hash table, implemented in memory, configured to store the compressed key and a data item associated with the input key in a bucket of the hash table identified by the hash value,
wherein the stored compressed key and data item are used in a packet forwarding application or a packet routing application.

2. The system of claim 1, wherein
the compressed key and the data item are stored in the bucket of the hash table to support the packet forwarding application or the packet routing application.

3. The system of claim 1, wherein the compressed key and the data item are stored in the bucket of the hash table to support a caching layer for a database.

4. The system of claim 1, further comprising:
an inverse hash function processor configured to perform an inverse function of the hash function using the compressed key stored in the bucket of the hash table and the hash value to generate the input key.

5. The system of claim 1, wherein the hash function divides the input key by a polynomial.

6. The system of claim 5, wherein the information further includes the quotient value that results from the hash function dividing the input key by the polynomial.

7. The system of claim 6, further comprising:
an inverse hash function processor configured to perform an inverse function of the hash function by adding the hash value to a product of the polynomial and the quotient value included in the information.

8. The system of claim 5, further comprising:
an inverse hash function processor configured to perform an inverse function of the hash function by: reconstructing the remainder value from the hash value and the second portion of the remainder value not used to form the hash value included in the information, and adding the reconstructed remainder value to a product of the polynomial and the quotient value included in the information.

9. The system of claim 5, further comprising:
an inverse hash function processor configured to perform an inverse function of the hash function by: reconstructing the remainder value from the hash value and the second portion of the remainder value not used to form the hash value included in the information for mapping the hash value to the input key, and adding the reconstructed remainder value to a product of the polynomial and the quotient value included in the information.

10. The system of claim 1, wherein the first portion of the remainder value corresponds to a plurality of least significant bits of the remainder value.

11. A computer-implemented method using a hardware processor, comprising:
performing, by the hardware processor, a hash function to map an input key to a hash value, wherein the hash function includes a division function that results in a quotient value and a remainder value having a first portion and a second portion, and the hash value is equal to the first portion of the remainder value that results from the division function;
generating a compressed key that includes information for mapping the hash value to the input key, wherein the information includes the quotient value and the second portion of the remainder value, and does not include the first portion of the remainder value; and storing the compressed key and a data item associated with the input key in a bucket of a hash table identified by the hash value, wherein the stored compressed key and data item are used in a packet forwarding application or a packet routing application.

12. The computer-implemented method of claim 11, wherein the compressed key and the data item are stored in the bucket of the hash table to support the packet forwarding application or the packet routing application.

13. The computer-implemented method of claim 11, wherein the compressed key and the data item are stored in the bucket of the hash table to support a caching layer for a database.

14. The computer-implemented method of claim 11, further comprising:
performing an inverse function of the hash function using the compressed key stored in the bucket of the hash table and the hash value to generate the input key.

15. A system, comprising:
a hash function processor implemented using a hardware device, the hash function processor configured to process a key-data item pair for storage by:
performing a hash function to map an input key to a hash value, wherein the hash function includes a division function that results in a quotient value and a remainder value having a first portion and a second portion, and the hash value is equal to the first portion of the remainder value that results from the division function, and
generating a compressed key that includes information for mapping the hash value to the input key by, at least in part, removing information from the input key that is predictable from the hash value, wherein the information for mapping the hash value to the input key includes the quotient value and the second portion of the remainder value, and does not include the first portion of the remainder value; and
a hash table configured to store the compressed key and a data item associated with the input key in a bucket of the hash table identified by the hash value, wherein the stored compressed key and data item are used in a packet forwarding application or a packet routing application.

16. The system of claim 15, wherein the compressed key and the data item are stored in the bucket of the hash table to support the packet forwarding application or the packet routing application.

17. The system of claim 15, wherein the compressed key and the data item are stored in the bucket of the hash table to support a caching layer for a database.

18. The system of claim 15, further comprising:
an inverse hash function processor configured to perform an inverse function of the hash function using the compressed key stored in the bucket of the hash table and the hash value to generate the input key.

19. The system of claim 15, wherein the hash function divides the input key by a polynomial.

20. The system of claim 19, wherein the information for mapping the hash value to the input key further includes the quotient value that results from the hash function dividing the input key by the polynomial.

* * * * *